US011022568B2

United States Patent
Keskin et al.

(10) Patent No.: US 11,022,568 B2
(45) Date of Patent: Jun. 1, 2021

(54) METHOD OF DETERMINING THE DISPLACEMENT OF A COMPONENT

(71) Applicant: ROLLS-ROYCE plc, London (GB)

(72) Inventors: Akin Keskin, Derby (GB); Luca Miller, Derby (GB); Simon Cross, Derby (GB)

(73) Assignee: Rolls-Royce plc, London (GB)

( * ) Notice: Subject to any disclaimer, the term of this patent is extended or adjusted under 35 U.S.C. 154(b) by 3 days.

(21) Appl. No.: 16/740,685

(22) Filed: Jan. 13, 2020

(65) Prior Publication Data
US 2020/0240932 A1      Jul. 30, 2020

(30) Foreign Application Priority Data

Jan. 30, 2019 (GB) ..................................... 1901244

(51) Int. Cl.
*G01N 23/04* (2018.01)
*B64F 5/60* (2017.01)

(52) U.S. Cl.
CPC ............... *G01N 23/04* (2013.01); *B64F 5/60* (2017.01); *G01N 2291/2693* (2013.01); *G01N 2291/2694* (2013.01)

(58) Field of Classification Search
CPC ........... G01N 23/04; G01N 2291/2693; G01N 2291/2694; B64F 5/60; G06T 2207/30164; G06T 2207/10124; G06T 7/0004
See application file for complete search history.

(56) References Cited

U.S. PATENT DOCUMENTS 3,992,627 A   11/1976 Stewart
4,803,639 A * 2/1989 Steele ................... G06T 7/0004
                                            702/40
(Continued)

FOREIGN PATENT DOCUMENTS

CA        1258924       8/1989
EP        0234537       9/1987
(Continued)

OTHER PUBLICATIONS

European Search Opinion with Communication Transmittal for Patent Application No. EP20150210.1 dated Mar. 5, 2020, 4 pages.
(Continued)

*Primary Examiner* — Courtney D Thomas
(74) *Attorney, Agent, or Firm* — Brinks Gilson & Lione (57) ABSTRACT

A method of determining the displacement of a component within a device during operation of the device, the method comprising the steps of: obtaining a first x-ray image of the device while the device is in a first operation state; obtaining a second x-ray image of the device while the device is in a second operation state different to the first operation state; processing each of the first and the second image, wherein the processing comprises applying a filter obtained based on the noise of the image and a frequency characteristic of the image; superimposing the first and the second images to align a predetermined point in each of the first and the second images; and measuring the displacement of an edge associated with the component between the first and the second image to obtain the displacement of the component within the device during operation of the device.

16 Claims, 5 Drawing Sheets

(56) References Cited

U.S. PATENT DOCUMENTS

| | | | |
|---|---|---|---|
| 8,917,320 B2* | 12/2014 | Beauchemin | G06T 7/60 348/92 |
| 2004/0098156 A1* | 5/2004 | Hattori | G06T 7/0004 700/110 |
| 2009/0257552 A1 | 10/2009 | Warner et al. | |
| 2010/0220918 A1 | 9/2010 | Iwahashi et al. | |
| 2013/0223722 A1 | 8/2013 | Oeckl et al. | |

FOREIGN PATENT DOCUMENTS

| | | |
|---|---|---|
| EP | 0905509 | 3/1999 |
| EP | 3255518 | 12/2017 |

OTHER PUBLICATIONS

Great Britain search report dated Jul. 29, 2019, issued in GB Patent Application No. 1901244.2.
European search report dated Feb. 21, 2020, issued in EP Patent application No. 20150210.
Vardar, et al, "Failure Analysis of gas turbine blades in a thermal power plant", Engineering Failure Analysis, vol. 14, No. , Jan. 18, 2007, pp. 743-749, 2006.
KK Dhanya, "Image Registration Techniques Classification: A Review", International Journal of Research in Advent Technology, Jan. 1, 2014, pp. 2321-9637.

* cited by examiner

METHOD OF DETERMINING THE DISPLACEMENT OF A COMPONENT

CROSS-REFERENCE TO RELATED APPLICATIONS

This specification is based upon and claims the benefit of priority from United Kingdom patent application number GB 1901244.2 filed on Jan. 30, 2019, the entire contents of which are incorporated herein by reference.

BACKGROUND

Technical Field

The present disclosure relates to a method of determining the displacement of a component within a device during operation of the device, a computer program comprising code configured to instruct the computer system to perform the method and a computer system for determining the displacement of a component within a device during operation of the device.

Description of the Related Art

X-ray images are a useful means of understanding detailed device behaviour during the design, operation and verification of devices such as gas turbine engines. X-ray images may be obtained at different locations within a device and under different operating conditions of the device. Such images may then be analysed to understand if the device is behaving as intended under the different operating conditions of the device. In particular, the location of particular components in different operating states of the device may be obtained. Capture, analysis and storage of the images may be performed digitally.

One approach is to use the x-ray image data and the assistance of a human operator to manually superimpose the x-ray images of the device in different modes of operation. The superposition of the images allows the operator to visualise the displacement of components within the device during the different operation states. The movement of the component may further be derived based on displacement relative to the different modes of operation.

However, the x-ray imaging and analysis process can take a significant amount of time. In addition to this, due to the nature of manual superposition, different operators may derive different estimated locations of a component. In addition to this, the accuracy of the estimated location of the component can vary between operators. The accuracy of the determination may be increased by averaging the estimates obtained from multiple human operators. However, this requires multiple operators to review the image and extends the time required to perform the analysis even further.

It can therefore be seen that there is a desire for a method of determining the displacement of a component within a device that is capable of providing accurate measurements in a short amount of time.

SUMMARY

According to a first aspect there is provided a method of determining the displacement of a component within a device during operation of the device, the method comprising the steps of: obtaining a first x-ray image of the device while the device is in a first operation state; obtaining a second x-ray image of the device while the device is in a second operation state different to the first operation state; processing each of the first image and the second image, wherein the processing comprises applying a filter obtained based on the noise of the image and a frequency characteristic of the image or applying a transformation to the image data to reduce the deviation of the frequencies of appearance of pixel values within the image; superimposing the first image and the second image to align a predetermined point in each of the first image and the second image; and measuring the displacement of an edge associated with the component between the first image and the second image to obtain the displacement of the component within the device during operation of the device.

According to a second aspect there is provided a method of determining the displacement of a component within a device during operation of the device, the method comprising the steps of: obtaining a first x-ray image of the device while the device is in a first operation state; obtaining a second x-ray image of the device while the device is in a second operation state different to the first operation state; processing each of the first image and the second image, wherein the processing comprises applying a filter obtained based on the noise of the image and a frequency characteristic of the image; superimposing the first image and the second image to align a predetermined point in each of the first image and the second image; and measuring the displacement of an edge associated with the component between the first image and the second image to obtain the displacement of the component within the device during operation of the device.

According to a third aspect there is provided a method of determining the displacement of a component within a device during operation of the device, the method comprising the steps of: obtaining a first x-ray image of the device while the device is in a first operation state; obtaining a second x-ray image of the device while the device is in a second operation state different to the first operation state; processing each of the first image and the second image, wherein the processing comprises applying a transformation to the image data to reduce the deviation of the frequencies of appearance of pixel values within the image; superimposing the first image and the second image to align a predetermined point in each of the first image and the second image; and measuring the displacement of an edge associated with the component between the first image and the second image to obtain the displacement of the component within the device during operation of the device.

Optionally the processing of each of the first image and the second image further comprises a normalisation step comprising: determining the frequency of appearance of data values within the image; and applying a transformation to the image data such that the fraction of the transformed image data at least one of a minimum and a maximum value has a predetermined value.

Optionally, the processing of each of the first image and the second image further comprises: selecting a pixel within the image; determining if the intensity value of the pixel is above a predetermined threshold; and assigning an intensity value to the pixel that is an average of the surrounding pixels if the intensity value of the pixel is above the predetermined threshold.

Optionally, the processing of each of the first image and the second image further comprises a smoothing step comprising: selecting a pixel within the image; and assigning an intensity value to the pixel that is an average of the surrounding pixels.

Optionally, the processing of each of the first image and the second image comprises performing the smoothing step before and after the filter is applied. Optionally, the processing of each of the first image and the second image comprises performing the normalisation step before and after a smoothing step.

Optionally, the filter is derived to minimize the mean square error between a frequency characteristic of an ideal image and a frequency characteristic of the image.

Optionally, the filter is performed on plural sub-regions of the image.

Optionally, wherein the processing of each of the first image and the second image further comprises an edge detection step comprising at least one of: applying a Gaussian filter to the image; calculating the image gradient and each point in the image; suppressing non-maximum gradients pixels; and performing hysteresis thresholding.

Optionally, the processing of each of the first image and the second image further comprises removal of image artefacts after the edge detection step. Optionally the images are aligned by detecting points of interest using a speeded up robust features algorithm.

Optionally, the predetermined point is associated with a predetermined component of the device.

According to a fourth aspect there is provided a method of determining the displacement of a component within a device during operation of the device, the method comprising the steps of: obtaining a first x-ray data set via a simulation, the first x-ray data set corresponding to a first image of the device while the device is in a first operation state; obtaining a second x-ray image of the device while the device is in a second operation state different to the first operation state; processing each of the first image and the second image, wherein the processing comprises applying a filter obtained based on the noise of the image and a frequency characteristic of the image or applying a transformation to the image data to reduce the deviation of the frequencies of appearance of pixel values within the image; superimposing the first image and the second image to align a predetermined point in each of the first image and the second image; and measuring the displacement of an edge associated with the component between the first image and the second image to obtain the displacement of the component within the device during operation of the device.

According to a fifth aspect there is provided a method of determining the displacement of a component within a device during operation of the device, the method comprising the steps of: obtaining a first x-ray data set via a simulation, the first x-ray data set corresponding to a first image of the device while the device is in a first operation state; obtaining a second x-ray image of the device while the device is in a second operation state different to the first operation state; processing each of the first image and the second image, wherein the processing comprises applying a filter obtained based on the noise of the image and a frequency characteristic of the image; superimposing the first image and the second image to align a predetermined point in each of the first image and the second image; and measuring the displacement of an edge associated with the component between the first image and the second image to obtain the displacement of the component within the device during operation of the device.

According to a sixth aspect there is provided a method of determining the displacement of a component within a device during operation of the device, the method comprising the steps of: obtaining a first x-ray data set via a simulation, the first x-ray data set corresponding to a first image of the device while the device is in a first operation state; obtaining a second x-ray image of the device while the device is in a second operation state different to the first operation state; processing each of the first image and the second image, wherein the processing comprises applying a transformation to the image data to reduce the deviation of the frequencies of appearance of pixel values within the image; superimposing the first image and the second image to align a predetermined point in each of the first image and the second image; and measuring the displacement of an edge associated with the component between the first image and the second image to obtain the displacement of the component within the device during operation of the device.

Optionally, the fourth, fifth or sixth aspect is combined with at least one of the optional features discussed above.

Optionally, the device is a gas turbine engine.

According to a seventh aspect there is provided a computer program comprising code means that, when executed by a computer system, instructs the computer system to perform the first to sixth aspect.

According to a eighth aspect there is provided a computer system for determining the displacement of a component within a device during operation of the device, the system comprising at least one processor and memory, the memory storing code that performs the method of the first to sixth aspect.

According to a ninth aspect there is provided a method of optimizing and/or monitoring a device, comprising performing the method of the first to sixth aspect, wherein the method further comprises modifying the device or a component of the device or planning a maintenance schedule for the device or the component of the device based on the determination of the displacement of the component.

DESCRIPTION OF THE DRAWINGS

Embodiments will now be described by way of example only, with reference to the figures in which.

DETAILED DESCRIPTION

Aspects and embodiments of the present disclosure will now be discussed with reference to the accompanying figures. Further aspects and embodiments will be apparent to those skilled in the art.

Figure 1:
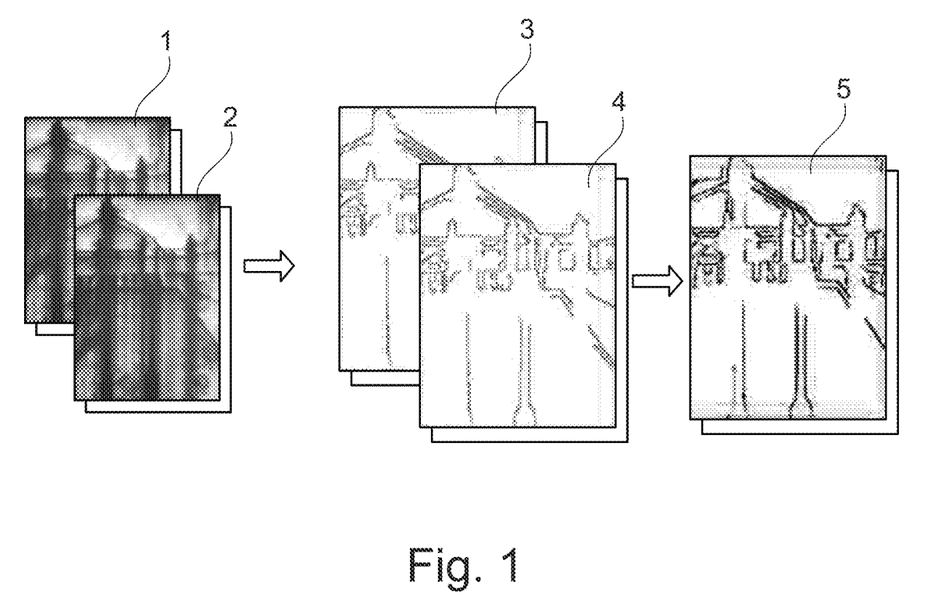
FIG. 1 is an example of images at different processing steps.

FIG. 1 illustrates examples of images at different stages of processing. First and second images 1,2 are separate images of a device that have been obtained of the device in different operating conditions.

Each of the first and second image 1,2 may be obtained using x-ray imagery of the device. The images may therefore indicate the positions of components within the device that are not visible by physical inspection of the device. The intensity of the pixels within the images may indicate the position of material within the device that forms the various components of a device. For example, dark pixels associated with a lower intensity in the image may indicate the presence of material, whereas light pixels associated with a higher intensity may indicate the lack of presence of a material. Areas of dark pixels associated with a lower intensity may therefore indicate the presence of a component in the image. The boundary between an area of dark pixels associated with a lower intensity and an area of light pixels associated with a higher intensity may therefore be the edge of a component in the device.

In the example discussed above, the images 1,2 are obtained using x-ray imagery of the device. However, the images may supplemented by image data obtained by another imaging method such as ultrasound imagery, visible light imagery, thermal imaging, acoustic imagery or any other technique capable of producing special information related to the materials forming the device.

At least one of the images 1,2 may be obtained by a simulation of the device. For example, a mechanical simulation involving simulation of each component of the device and the interactions of these components may be used to produce a 3D computer model of the device in various states of operation. Images of sections of the device obtained from the 3D computer model may be compared to each other using the method described in detail below. Images of sections of the device obtained from the 3D computer model may also be compared to images obtained by imaging of a physical device.

The images 1,2 may be obtained in varying states of operation of the device. For example, at least one of the images 1,2 may be obtained when the device is not operating. Such a state of operation may be referred to as a cold state because the components of the device have not increased in temperature due to the operation of the device. Further operation states of the device may be when the device has been in operation for a certain amount of time. A further state of operation of the device may include a state in which the device is not operating, but immediately after the device has been operating for a period of time. Further states of operation may be when different components within the device are in operation. For example, different air systems in the device may be operating in different states of operation of the device.

The components of the device may also move within the device for other reasons. For example, operation of the device may result in the temperature of the components of the device increasing and the position of the components therefore shifting within the device. Components may shift due to vibration of the device during operation of the device. Components may also move within the device due to the intended operation of the device. For example, values or switches may open and close during operation of the device.

The images 1,2 may then undergo image processing to produce processed images 3,4. In the example shown in FIG. 1, the first image 1 has been processed to obtain a first processed image 3. The second image 2 has been processed to obtain a second processed image 4. The image processing process is described in greater detail below. Following the image processing process, the first and second processed images 3,4 may then be combined to form a combined image 5. The image combining process is described in greater detail below. The combined image 5 may then be analysed to determine the displacement of the component in the device. This analysis is described in greater detail below.

Figure 2:
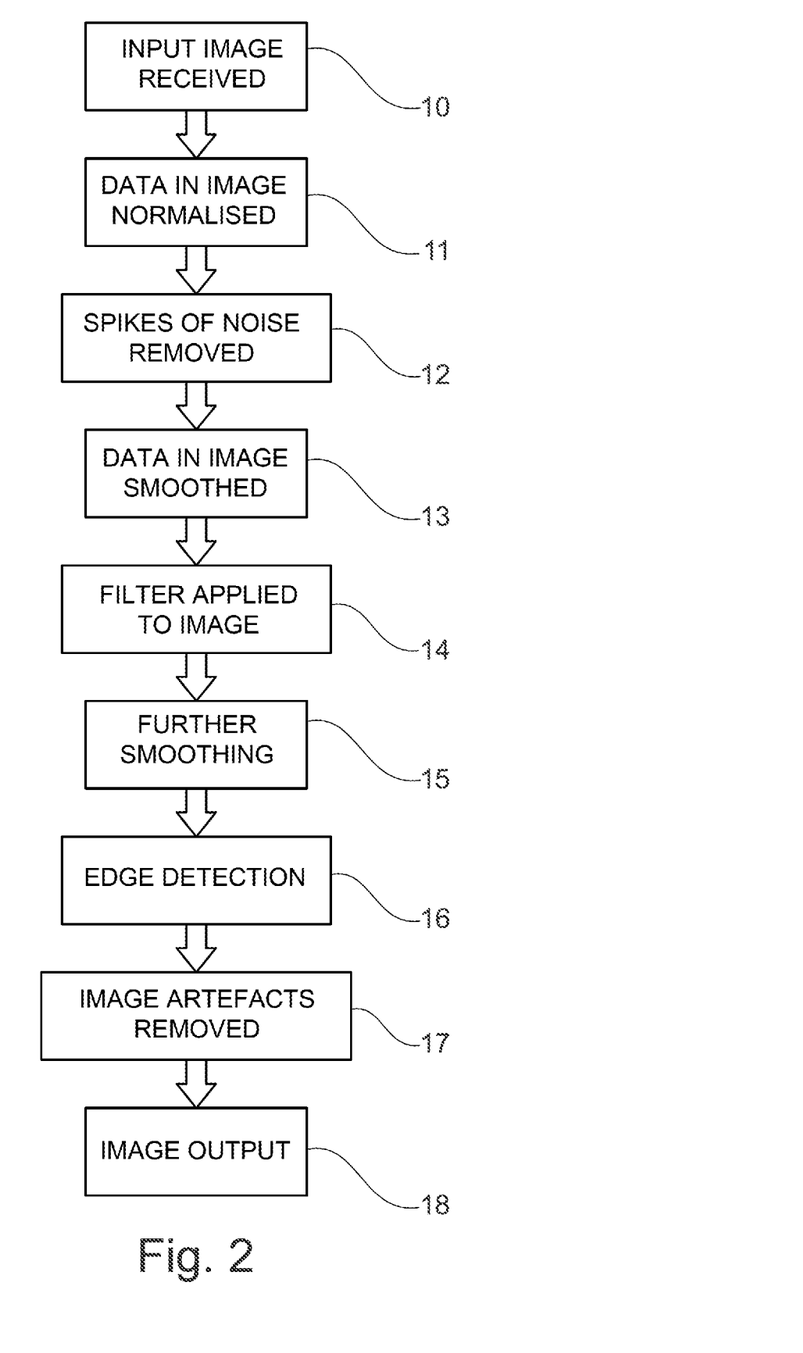
FIG. 2 is a flow chart illustrating an example set of process steps for processing an image.

FIG. 2 shows an example of the image processing process that may be applied to obtain the processed images 3,4 using the initial images (1,2). In a first step 10, an input image 1,2 may be received. The input image may have been obtained using any of the methods discussed above. The input image may, for example, be a grey scale or colour representation of the x-ray data obtained by x-ray imaging of the device. The input image may, for example, be stored in a 1-bit, 8-bit or 16-bit greyscale format.

In a second step 11, the data in the image may be normalised. The normalisation of the data may be based on the frequency of appearance of the data. The normalisation of the data may involve identifying pixel values or pixels that fall within at least one of the bottom 5% and or top 5% of the frequency of appearance, optionally at least one of the bottom 1% or top 1% of the frequency of appearance, and replacing these pixels with a replacement data value. The normalisation of the data may involve identifying pixel values or pixels that fall within at least one of the bottom 5% and or top 5% of the intensity values of the image, optionally at least one of the bottom 1% or top 1% of the intensity values of the image, and replacing these pixels with the replacement data value. The replacement data value may be an average of the pixels surrounding the selected pixel. The replacement data value may be a minimum value (also known as minimum saturation) of intensity for an identified pixel falling with the bottom 5% or 1% of intensity values. The replacement data value may be a maximum value of intensity (also known as maximum saturation) for a identified pixel falling with the top 5% or 1% of intensity values. The normalisation of the data of the image may involve applying a transformation to the image data such that a predetermined quantity of the intensity values of the pixels of the transformed image data are at least one of a minimum or a maximum saturation. The predetermined quantity may be, for example, 5% or 1% of the total number of pixels in the image. The data values of the pixels may further be normalised to a value between 0 and 1 during this step.

The normalisation step may introduce localised noise into the image data. The localised noise may be referred to as noise spikes in the data. In a third step 12, spikes of noise may be located and removed from the data. For example, the image data may be analysed to determine pixels that have an intensity value that is over a predetermined threshold. Pixels that have an intensity value over the predetermined threshold may be determined to contain noise. The data value in pixels determined to be containing noise may be replaced with a value that is an average of the surrounding pixels. Alternatively, the data value in the pixels may be replaced with a predetermined pixel value. Both the predetermined threshold and the predetermined pixel value, where used, may be set based on previous analysis of the images.

In a fourth step 13, the data in the image may be smoothed. Smoothing may be performed by applying a nearest neighbours algorithm to the image. In the application of a nearest neighbours algorithm, a pixel is selected and the data value of that pixel is replaced by an average of the data value of the pixel and a number of surrounding pixels. The surroundings pixels may include each of the eight pixels immediately adjacent to the selected pixel. In this case, the nearest neighbours algorithm is being applied using a 3×3 mask. The nearest neighbours algorithm may use a larger mask, in which case an average data value of all of the pixels located under the mask is used to replace the data value of the selected pixel. The weighting of the pixels may vary. For example, the pixel distribution may be weighted using a Gaussian function when obtaining the average value of the pixels under the mask.

In a fifth step 14, a filter may be applied to the image. The filter may be 2D adaptive noise removal filter. The filter may be obtained based on the noise of the image and a frequency characteristic of the image. The frequency characteristic of the image may be obtained by performing a Fourier transform on the image data. The filter may be a Wiener filter and may therefore minimize the mean square error between the frequency characteristic of the image before the noise was applied to the image and the obtained image. The filter may, for example, be applied using a 9×9 mask. Other mask sizes may be used.

In a sixth step 15, a further smoothing step may be applied. The further smoothing step may be performed using the same conditions as the fourth step 13. However, the conditions may vary. For example, a different size mask or a different weighting of the pixel values within the mask may be used.

In a seventh step 16, an edge detection process may be applied. The edge detection process may result in the removal of data from the image that are determined not to form part of an edge in the image from the image. Pixels corresponding to data that is not determined to form part of an edge may be set to a zero value. The edge detection process may be a canny edge detector.

The edge detection process may comprise at least one of the following sub-steps. A first sub-step of the edge detection process may be an application of a Gaussian filter to the image. For example, the image data may be convoluted with a Gaussian matrix. A second sub-step of the edge detection process may be the determination of the intensity gradient of each pixel of the image. A third sub-step of the edge detection process may be the application of non-maximum suppression. In this step, the gradient of each pixel may be compared to adjacent pixels and the pixel may be determined to be part of an edge if the gradient value is larger than the adjacent pixels.

A fourth sub-step of the edge detection process may be a hysteresis step. In the hysteresis step, an upper and a lower threshold may be selected. Pixel gradients which are higher than the upper threshold may be determined to be part of an edge. Pixel gradients which are lower than the lower threshold may be determined not to be part of an edge. The lower threshold, for example may be $7.5 \times 10^{-2}$ in the case where the image data has been normalised to a maximum value of 1. Pixel gradients which are between the upper and the lower threshold may be determined to be part of an edge if the pixel is adjacent to a pixel above the upper threshold and may be determined not to be part of an edge if this is not the case.

In an eighth step 17, image artefacts may be removed from the image. The image artefacts removed may have been introduced due to the edge detection process performed in the seventh step 16. The image artefacts may be located by determining an area of pixels with a particular high or low intensity value with a total area that is less than a predetermined value. The predetermined value may be, for example, 100 pixels. The pixels determined to be part of the artefact may be replaced with an average pixel value of the image or a zero value.

In a ninth step 18, the processed images 3,4 may be output for analysis.

The processing steps may be performed in the order set out above. However, the method is not restricted to this order and some of the steps may be omitted and performed at a different time. Any of the steps may be repeated more than once. For example, only the filtering step may be performed. In a further example, only one of the smoothing step 13 and further smoothing step 15 may be performed. The steps above are described in relation to individual pixels of the image. Any of the steps described above may be performed on each of the pixels in the image. Any of the steps described above may be performed on at least one sub region of the image.

Figure 3:
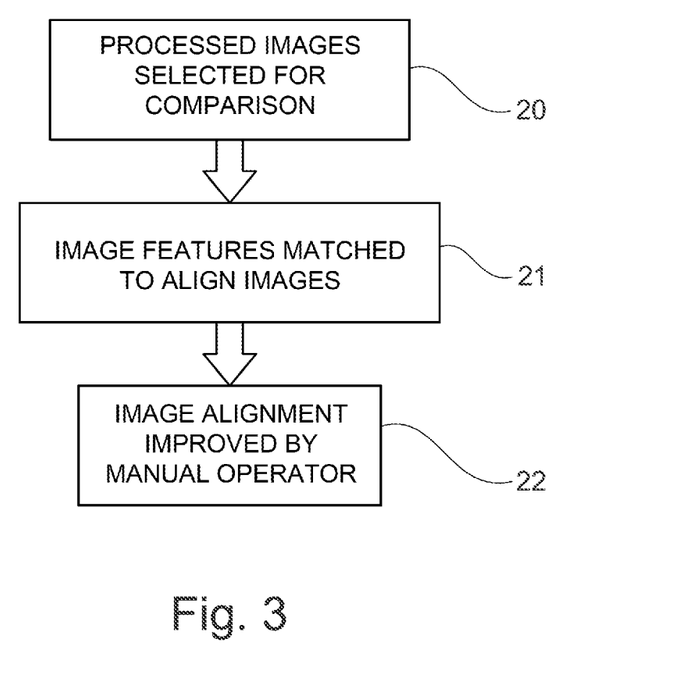
FIG. 3 is a flow chart illustrating an example set of process steps for comparison of images.

The combining process will now be described in more detail. An example of the steps that may be performed in the combining process is shown in FIG. 3. In a first combining step 20, two processed images 3,4 are selected for comparison. The images may both have been processed using the image processing process described above.

In a second combining step 21, features within the processed images 3,4 are matched to align the two images. Even if each of the processed images 3,4 were originally obtained from an identical perspective, displacement of the device within the images may have occurred between the two images being obtained. For example, in the case where the device is a gas turbine engine, displacement may have occurred due to engine mount movement during operation of the device. The processed images 3,4 may therefore be aligned based on a point associated with a particular component within the device. This component may be a predetermined component which is known to move minimally between the different operating conditions of the two images.

The processed images 3,4 may initially be aligned using a speeded-up robust features (SURF) algorithm to automatically detect features within the edge data. The SURF algorithm is used to pre-align the images to decrease later work required. The algorithm may involve the sub-steps of determining a notable feature or keypoint in the first image, determining the orientation of the feature or keypoint and determining a descriptor containing information of the neighbourhood of the image of the keypoint. The determination of the keypoint may be performed using blob detection. The descriptor may then be used to orientate the first image with the second image. The processed images 3,4 may be initially aligned by a manual operator. The alignment may be performed based on a sub-region of at least one of the images. The alignment process may generate a 2D displacement vector corresponding to the transformation required to align the processed images 3,4.

In a third combining step 22, the alignment of the images may be improved by the manual operator using a graphical user interface (GUI). The GUI may display the images superimposed on one another to the manual operator. The user may be automatically directed to click on two points in the image that correspond. The displacement between the two points may then be used to improve the alignment of the images. The alignment step may be repeated multiple times until the images are aligned acceptably, resulting in a combined image 5.

Figure 4:
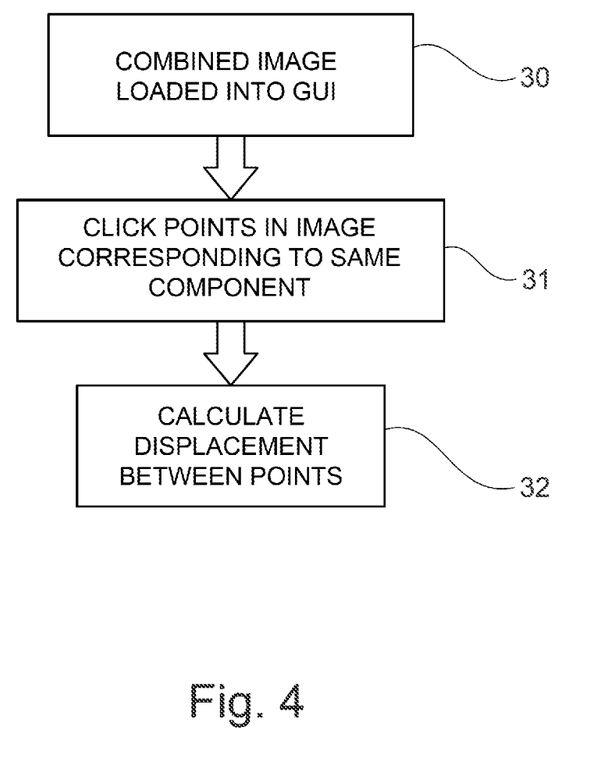
FIG. 4 is a flow chart illustrating an example set of process steps for conducting measurements on an image.

The analysis process will now be described in more detail. An example of the analysis process is shown in FIG. 4. In a first analysis step 30, a combined image 5 is selected for measurement and loaded into a GUI.

In a second analysis step 31, the user may click two points within the image that correspond to the same component, and/or the same part of a component in the different operating steps of the device. In a third analysis step 32, the displacement between the two points may then be calculated. The displacement may be calculated using a scaling factor. The scaling factor may be predetermined by the interface. Alternatively, the scaling factor may be determined by the user. Alternatively, the scaling factor may be embedded in the combined image 5. The displacement value may be displayed to the user. The displacement value may be scaled based on the device that is present in the combined image 5. For example, in the case of a gas turbine engine, the axial and radial displacement between the two points may be calculated.

The analysis process may be performed multiple times by different users and the result averaged to produce a final displacement measurement.

The method as described above may be applied to any device which may contain components which may become displaced in different operating states. For example, the method may be applied to a gas turbine engine. The method may be applied to other parts of an aeroplane, such as wings, fuselage or other devices, or components within an engine such as manifolds or channels.

The device being imaged may further be modified based on the measured displacement results. For example, if a component of the device is identified to be moving in an undesirable way between the different operating states of the device, the component may be modified. For example, if the movement is due to the high temperature of the device during an operating step, the material of the component may be modified based on the measured displacement to reduce the displacement. The location of components within the device may also be varied depending on the displacement measured. In addition to this, maintenance data based on the displacement of components may be determined based on the size of the displacement of the component during the operation of the device and a maintenance regime including, for example, an operation lifetime of a component, may be calculated.

Figure 5:
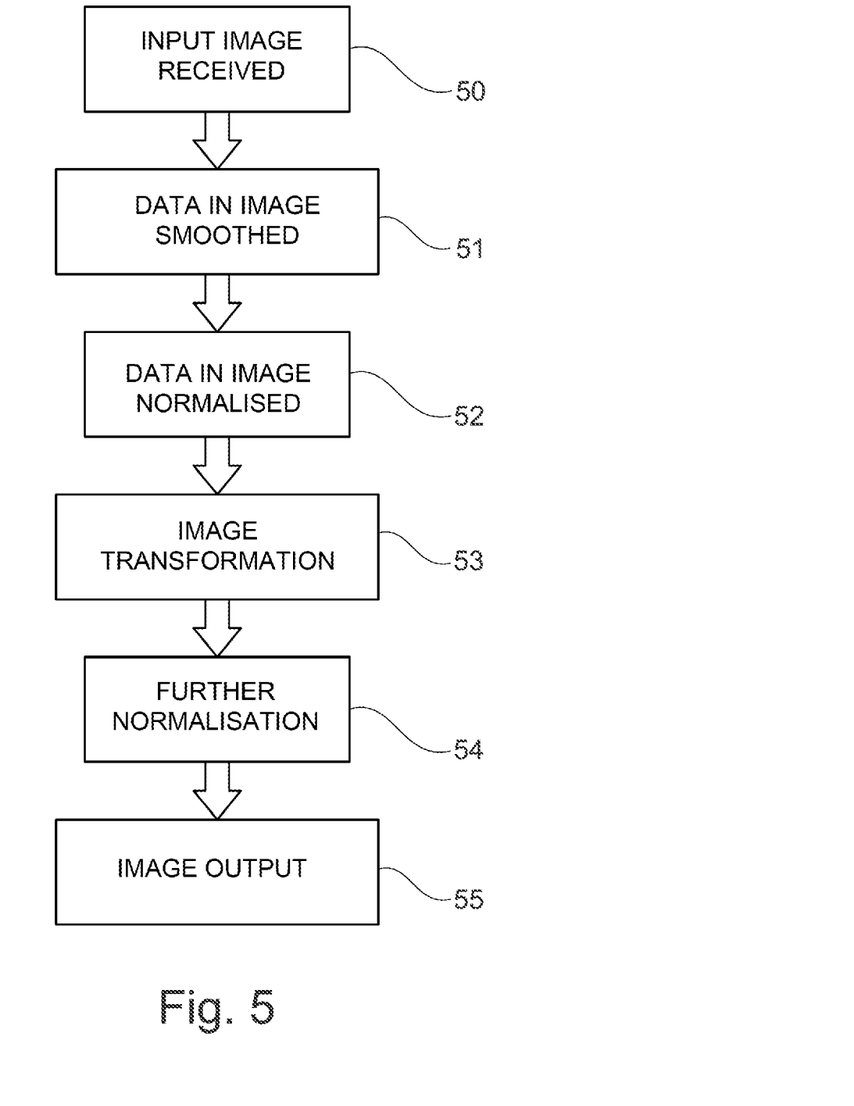
FIG. 5 is a flow chart illustrating an alternative example set of process steps for processing an image.

In an alternative embodiment, the image processing process may comprise a transformation step. An example of an image processing process including a transformation step is shown in FIG. 5. In a first step 50, an input mage process may be received. In a second step 51, a smoothing process may be performed. In a third step 52, a normalisation process may be performed. Each of these processes may correspond to the processes performed in the image processing process described above.

In a fourth step 53, an image transformation process may be performed. The transformation may reduce the deviation of the frequencies of appearance of pixel values within the image. The frequencies of appearance of pixel values may be determined by dividing the range of possible intensity values of the pixel data into a plurality of sub-ranges and assigning each pixel to one of the plurality of sub-ranges to determine the frequencies of appearance of the pixel values. The transformation may modify the intensity value of at least one of the pixels such that the deviation of the frequencies of appearance of the pixel values is reduced. The deviation may be a statistical measure of the variance of the frequencies of appearance of the pixel values. For example, the deviation may be the standard deviation of the frequencies of appearance of the pixel values. The transformation may equalize the frequency of appearance of each of the plurality of sub-ranges of pixel values. The transformation may be a histogram equalisation of the image data.

In a fifth step 54, a further normalisation process may be performed. In a sixth step 55, the processed image may be output for further analysis as described above. Each of these processes may correspond to the processes performed in the image processing process described above.

The processing steps in the alternative embodiment may be performed in the order set out above. However, the method is not restricted to this order and some of the steps may be omitted and performed at a different time. Any of the steps may be performed more than once. For example, only the transformation process may be performed. In a further alternative, the transformation process may be performed instead of the step of applying the filter described in the first embodiment. Alternatively, the step of applying the filter described in the first embodiment may be performed instead of the transformation process in the alternative embodiment discussed above. The steps above are described in relation to individual pixels of the image. Any of the steps described above may be performed on each of the pixels in the image. Any of the steps described above may be performed on at least one sub region of the image.

It will be understood that the invention is not limited to the embodiments above described. Various modifications and improvements can be made without departing from the concepts described herein. Except when mutually exclusive, any of the features may be employed separately or in combination with any other features and the disclosure extends to and includes all combinations and sub-combinations of one or more features described herein.

We claim:

1. A method of determining the displacement of a component within a device during operation of the device, the method comprising the steps of:
    obtaining a first x-ray image of the device while the device is in a first operation state;
    obtaining a second x-ray image of the device while the device is in a second operation state different to the first operation state;
    processing each of the first image and the second image, wherein the processing comprises applying a filter obtained based on the noise of the image and a frequency characteristic of the image or applying a transformation to the image data to reduce the deviation of the frequencies of appearance of pixel values within the image;
    superimposing the first image and the second image to align a predetermined point in each of the first image and the second image; and
    measuring the displacement of an edge associated with the component between the first image and the second image to obtain the displacement of the component within the device during operation of the device.

2. The method of claim 1, wherein the processing of each of the first image and the second image further comprises a normalisation step comprising:
    determining the frequency of appearance of data values within the image; and
    applying a transformation to the image data such that the fraction of the transformed image data at least one of a minimum and a maximum value has a predetermined value.

3. The method of claim 1, wherein the processing of each of the first image and the second image further comprises:
    selecting a pixel within the image;
    determining if the intensity value of the pixel is above a predetermined threshold; and
    assigning an intensity value to the pixel that is an average of the surrounding pixels if the intensity value of the pixel is above the predetermined threshold.

4. The method of claim 1, wherein the processing of each of the first image and the second image further comprises a smoothing step comprising:
    selecting a pixel within the image; and
    assigning an intensity value to the pixel that is an average of the surrounding pixels.

5. The method of claim 4, wherein the processing of each of the first image and the second image comprises performing the smoothing step before and after the filter is applied.

6. The method of claim 4, wherein the processing of each of the first image and the second image comprises performing the normalisation step before and after a smoothing step.

7. The method of claim 1, wherein the filter is derived to minimize the mean square error between a frequency characteristic of an ideal image and a frequency characteristic of the image.

8. The method of claim 1, wherein the filter is performed on plural sub-regions of the image.

9. The method of claim 1, wherein the processing of each of the first image and the second image further comprises an edge detection step comprising at least one of the following:
applying a Gaussian filter to the image;
calculating the image gradient and each point in the image;
suppressing non-maximum gradients pixels; and
performing hysteresis thresholding.

10. The method of claim 9, wherein the processing of each of the first image and the second image further comprises removal of image artefacts after the edge detection step.

11. The method of claim 1, wherein the first image and the second image are aligned by detecting points of interest using a speeded up robust features algorithm.

12. The method of claim 1, wherein the predetermined point is associated with a predetermined component of the device.

13. The method of claim 1, wherein the device is a gas turbine engine.

14. A method of determining the displacement of a component within a device during operation of the device, the method comprising the steps of:

obtaining a first x-ray data set via a simulation, the first x-ray data set corresponding to a first image of the device while the device is in a first operation state;

obtaining a second x-ray image of the device while the device is in a second operation state different to the first operation state;

processing each of the first image and the second image, wherein the processing comprises applying a filter obtained based on the noise of the image and a frequency characteristic of the image or applying a transformation to the image data to reduce the deviation of the frequencies of appearance of pixel values within the image;

superimposing the first and the second images to align a predetermined point in each of the first image and the second image; and measuring the displacement of an edge associated with the component between the first image and the second image to obtain the displacement of the component within the device during operation of the device.

15. The method of claim 14, wherein the device is a gas turbine engine.

16. A method of optimizing and/or monitoring a device, comprising performing the method of claim 1, wherein the method further comprises modifying the device or a component of the device or planning a maintenance schedule for the device or the component of the device based on the determination of the displacement of the component.

* * * * *